United States Patent
Polisky et al.

(10) Patent No.: US 10,635,410 B2
(45) Date of Patent: *Apr. 28, 2020

(54) SYSTEM TO COORDINATE SOURCE CODE MODULE CHANGES

(71) Applicant: Hartford Fire Insurance Company, Hartford, CT (US)

(72) Inventors: Dennis P. Polisky, Colchester, CT (US); Robert A. Griffith, Danielson, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/158,600

(22) Filed: Oct. 12, 2018

(65) Prior Publication Data

US 2019/0042209 A1 Feb. 7, 2019

Related U.S. Application Data

(63) Continuation of application No. 15/453,279, filed on Mar. 8, 2017, now Pat. No. 10,127,019.

(51) Int. Cl.
*G06F 8/33* (2018.01)
*G06F 8/71* (2018.01)
*G06F 8/70* (2018.01)

(52) U.S. Cl.
CPC ............... *G06F 8/33* (2013.01); *G06F 8/70* (2013.01); *G06F 8/71* (2013.01)

(58) Field of Classification Search
CPC .............. G06F 8/70; G06F 8/33; G06F 8/71
See application file for complete search history.

(56) References Cited

U.S. PATENT DOCUMENTS

| | | | | |
|---|---|---|---|---|
| 6,393,419 B1* | 5/2002 | Novak | ............... | G06Q 10/087 |
| 8,768,966 B2* | 7/2014 | Yaniv | ................ | G06F 16/2365 |
| | | | | 707/785 |
| 8,910,117 B2* | 12/2014 | Li | ............... | G06F 8/71 |
| | | | | 717/120 |
| 2010/0050155 A1* | 2/2010 | Iwama | ............... | G06F 11/3604 |
| | | | | 717/120 |
| 2010/0082560 A1* | 4/2010 | Wiger | ............... | G06F 16/2365 |
| | | | | 707/695 |

(Continued)

*Primary Examiner* — Viva Miller
(74) *Attorney, Agent, or Firm* — Buckley, Maschoff & Talwalkar LLC

(57) ABSTRACT

A source code repository data store may contain source code module components, and a communication interface may support user displays at remote developer devices. A module coordination system computer server may access an electronic work request record, associated with a work request identifier, a release date, and at least a first source code module component in the source code repository data store. A first remote developer device may establish a first user display including individual lines of code (where each line that has been changed since a previous release of the first source code module component is tagged with an associated work request identifier and is shown in association with a developer identifier). According to some embodiments, a first user display reflects all changes dynamically that have been made since the previous release of the first source code module component, including those with other developer identifiers and multiple release dates.

17 Claims, 18 Drawing Sheets

(56) References Cited

U.S. PATENT DOCUMENTS

| | | | |
|---|---|---|---|
| 2010/0114967 A1* | 5/2010 | Yaniv | G06F 16/2365 707/785 |
| 2011/0083122 A1* | 4/2011 | Chen | G06F 11/3664 717/124 |
| 2011/0270805 A1* | 11/2011 | Babka | G06F 16/235 707/687 |
| 2012/0173572 A1* | 7/2012 | Babka | G06F 16/235 707/769 |

* cited by examiner

SYSTEM TO COORDINATE SOURCE CODE MODULE CHANGES

CROSS-REFERENCE TO RELATED APPLICATION

The present application claims the benefit of U.S. patent application Ser. No. 15/453,279 entitled "SYSTEM TO COORDINATE SOURCE CODE MODULE CHANGES" and filed Mar. 8, 2017. The entire content of that application is incorporated herein by reference.

BACKGROUND

In some cases, an enterprise may want to maintain and utilize a number of different source code modules. For example, the source code modules may be associated with applications that the enterprise uses to facilitate sales, provide customer support, etc. Moreover, the enterprise may want to let software code developers update the source code modules as appropriate. For example, software code developers might update source code modules to support a new field in an online form, a new product being introduced, etc. Note that two different developers might be interested in simultaneously updating the same source code module. This however, can result in problems (e.g., when a first developer changes a line of code needed by a second developer).

To prevent this type of situation, an enterprise may implement a software control system such that a first developer can "check-out" a software code module while the developer changes the code and creates their own version (branch). When the module is checked-out, other developers may checkout and create their own unique version. In an environment with multiple independent change and various release cycles eventually merging these into a common branch can be problematic. Such an approach may be impractically time consuming, especially when there are a substantial number of developers and/or a substantial number of changes that need to be made to the source code modules (e.g., an enterprise may need to make thousands of such changes to software code modules to support evolving business requirements).

It would therefore be desirable to provide systems and methods to automatically facilitate coordination of source code module changes in a way that results in an accurate and efficient management of changes by developers and that allows flexibility and effectiveness when changes migrate between environments.

SUMMARY OF THE INVENTION

According to some embodiments, systems, methods, apparatus, computer program code and means to automatically facilitate coordination of source code module changes in a way that results in an accurate and efficient management of changes by developers (and that allows flexibility and effectiveness when changes migrate between environments) may be provided. In some embodiments, a back-end module coordination system computer server may access an enterprise source code repository data store containing source code module components, and a communication interface may support interactive user interface displays at remote developer devices. The module coordination system computer server may access an electronic work request record, associated with a work request identifier, a release date, and at a first source code module component in the enterprise source code repository data store. A first remote developer device (associated with a first developer identifier) may establish a first interactive user interface display including individual lines of code (where each line of code that has been changed since a previous release of the first source code module component is tagged with associated work request identifier and is shown in association with a developer identifier). According to some embodiments, the first interactive user interface display reflects all changes dynamically that have been made since the previous release of the first source code module component, including those associated with other developer identifiers and multiple release dates.

Some embodiments comprise: means for accessing, by the back-end module coordination system computer server, an enterprise source code repository data store including a plurality of source code module components; means for accessing, by the back-end module coordination system computer server, an electronic work request record, the work request record being associated with a work request identifier, a release date, and at least a first source code module component in the enterprise source code repository data store; means for establishing, through a communication interface that facilitates an exchange of electronic messages, including messages exchanged via a distributed communication network, a first interactive user interface display at a first remote developer device, associated with a first developer identifier, including individual lines of code from the first source code module component, wherein each line of code that has been changed since a previous release of the first source code module component is tagged with associated work request identifier and is graphically provided in association with a developer identifier, wherein the first interactive user interface display reflects all changes dynamically that have been made since the previous release of the first source code module component, including those associated with other developer identifiers and multiple release dates; and for associating the first source code module component with a current module lock status comprising one of: an open edit state during which developers can edit the first source code module component, a closed edit state during which at least some developers cannot edit the first source code module component, and a compiling state indicating that the first source code module component is being complied by the system; and means for associating the first source code module component with a frozen status indicating that tagged lines of code in the first source code module component cannot be edited.

In some embodiments, a communication interface associated with a back-end module coordination system computer server exchanges information with remote developer devices. The information may be exchanged, for example, via public and/or proprietary communication networks.

Technical effects of some embodiments of the invention are improved and computerized ways to facilitate coordination of source code module changes in a way that results in an accurate and efficient management of changes by developers and that allows flexibility and effectiveness when changes migrate between environments. With these and other advantages and features that will become hereinafter apparent, a more complete understanding of the nature of the invention can be obtained by referring to the following detailed description and to the drawings appended hereto.

DETAILED DESCRIPTION

Figure 1:
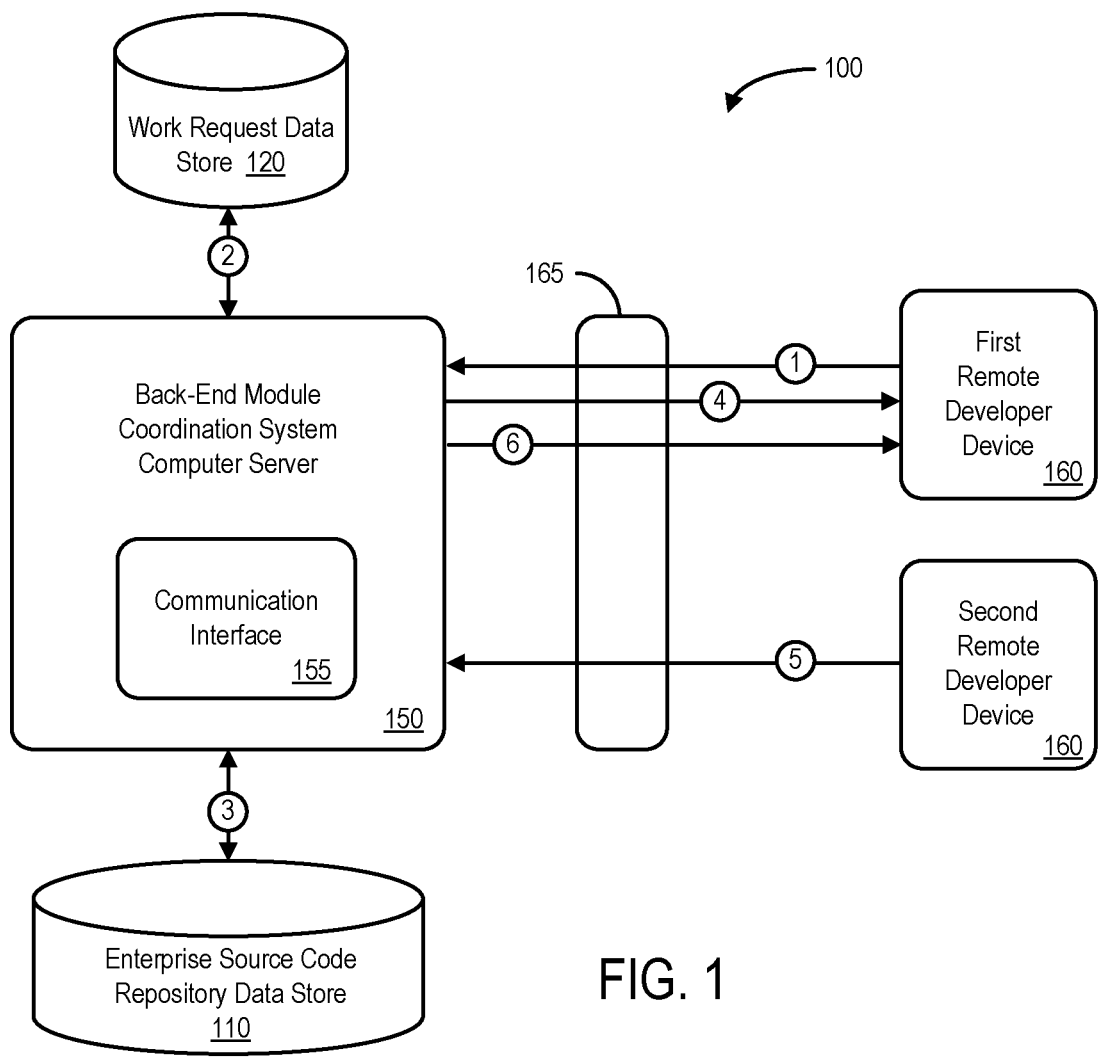
FIG. 1 is a high-level block diagram of a system according to some embodiments.

The present invention provides significant technical improvements to facilitate electronic messaging and dynamic data processing. The present invention is directed to more than merely a computer implementation of a routine or conventional activity previously known in the industry as it significantly advances the technical efficiency, access, and/or accuracy of communications between devices by implementing a specific new method and system as defined herein. The present invention is a specific advancement in the area of information definition by providing benefits in data accuracy, data availability, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third party systems, networks, and subsystems. For example, in the present invention multiple developers may access and change lines of code in a source code module, while seeing what other developers are doing, etc., thus improving the overall performance of the system associated with an enterprise (e.g., by increasing productivity and reducing errors). Moreover, embodiments associated with automatic coordination might further improve communication network performance, user interactions, programming (e.g., by reducing conflicts associated with code updates that would require additional network access), etc. Moreover, embodiments may improve software code development for an enterprise by coordinating changes being made by a substantial number of developers and/or to a large number of software components (e.g., by eliminating the need to track multiple software versions for a single software component).

An enterprise may maintain and utilize a number of different source code module "components" associated with applications used to process business transactions, allocate resources, etc. As used herein, the term "component" might refer to, for example, an executable program, a processing element, a software container, etc. In some case, the enterprise may want to let software code developers update the source code modules, such as by changing the code to support new interface screens, ways of formatting data, etc. When two different developers try to simultaneously update the same source code module, however, problems can arise (e.g., there might be a conflict between the updates being introduced). To prevent this situation, a software control system might be implemented such that a first developer "check-outs" a software code module while or she changes the code, thus preventing other developers from accessing the module. Such an approach may be impractical (e.g., due to delays caused by lock outs and/or difficulties with tracking many different software versions being developed), especially when there are a substantial number of developers (e.g., hundreds of programmers might work for an enterprise), a large number of source code module components (e.g., hundreds of such components) and/or a substantial number of changes being made to those source code modules.

It would therefore be desirable to provide systems and methods to automatically facilitate coordination of source code module changes in a way that results in an accurate and efficient management of changes by developers (and that allows flexibility and effectiveness when changes migrate between environments). FIG. 1 is a high-level block diagram of a system 100 according to some embodiments of the present invention. In particular, the system 100 includes a back-end module coordination system computer server 150 that may access information in an enterprise source code repository data store 110 (e.g., storing a set of electronic records representing source code for modules and/or components of enterprise software). The back-end module coordination system computer server 150 may also exchange information with remote developer devices 160 (e.g., via a firewall 165). According to some embodiments, a communication interface 155 of the back-end module coordination system computer server 150 may communicate with the developer devices 160, access information in the enterprise source code repository data store 110, and coordinate changes to source code module components. Note that embodiments may be associated with periodic (or asynchronous) types of uploads. Further note that the back-end module coordination system computer server 150 might also be associated with a third party, such as a vendor that performs a service for an enterprise.

The back-end module coordination system computer server 150 might be, for example, associated with a Personal Computer ("PC"), laptop computer, smartphone, an enterprise server, a server farm, and/or a database or similar storage devices. According to some embodiments, an "automated" back-end module coordination system computer server 150 may automatically coordinate changes to information in the enterprise source code repository data store 110. As used herein, the term "automated" may refer to, for example, actions that can be performed with little (or no) intervention by a human.

As used herein, devices, including those associated with the back-end module coordination system computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end module coordination system computer server 150 may store information into and/or retrieve information from the enterprise source code repository data store 110 and/or a work request data store 120. The work request data store 120 might, for example, store electronic records representing changes that need to be made to enterprise software, including a work request identifier, release date, module identifier, etc. The enterprise source code repository data store 110 may contain software that was downloaded and/or that was originally input via a remote developer device 160 (e.g., by developer). The enterprise source code repository data store 110 may be locally stored or reside remote from the back-end module coordination system computer server 150. As will be described further below, the enterprise source code repository data store 110 may be used by the back-end module coordination system computer server 150 to automatically coordinate software changes. Although a single back-end module coordination system computer server 150 is shown in FIG. 1, any number of such devices may be included. Moreover, various devices described herein might be combined according to embodiments of the present invention. For example, in some embodiments, the back-end module coordination system computer server 150, enterprise source code repository data store 110, and/or work request data store 120 might be co-located and/or may comprise a single apparatus.

According to some embodiments, the system 100 may automatically coordinate software changes for an enterprise. For example, at (1) at first remote developer device 160, associated with a first developer, might open or access a work request stored in the work request data store 120 at (2). The first developer might then begin to make changes at (3) to a first source code module component (e.g., to add a new screen to a customer interface). As part of this process, lines of code from the first source code module component are provided to the first remote developer device at (4) (e.g., so that the lines of code may be rendered on a display for the first developer). Note that other developers may also communicate with the back-end module coordination system computer server 150. For example, at (5), a second developer associated with a second remote developer device 160 may also make changes to source code module components. According to some embodiments, any number of developers may change the same component, however they may need to have it checked out exclusively during their change. According to some embodiments, the communication interface 155 in the back-end module coordination system computer server 150 may arrange for the interactive user interface display provided to the first developer to reflect all changes dynamically that are in progress for the first source code module component, including those associated with other developer identifiers, regardless of release date.

Figure 2:
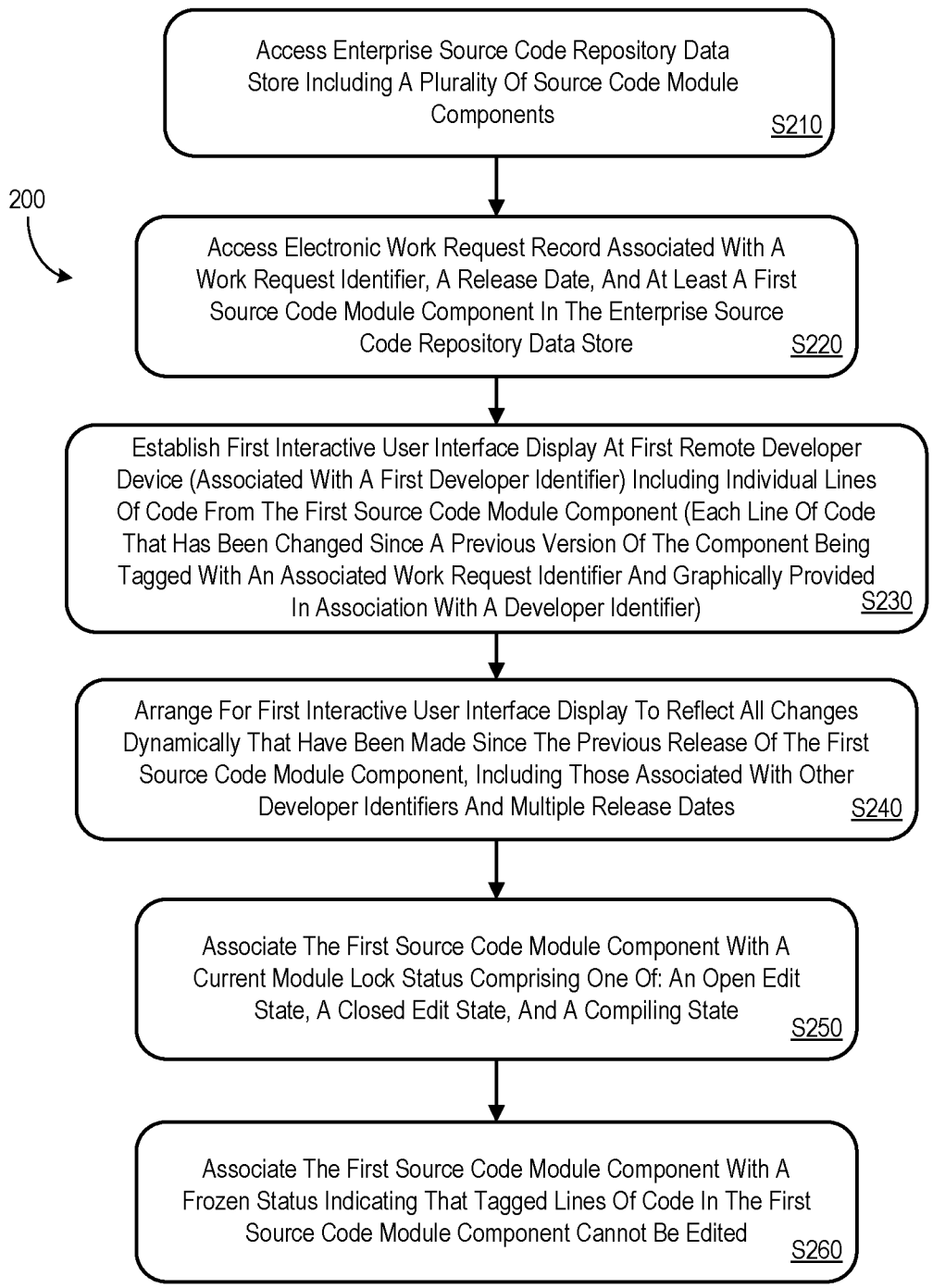
FIG. 2 illustrates a method according to some embodiments of the present invention.

Thus, some embodiments may let multiple developers simultaneously update a source code module component. Note that the system 100 of FIG. 1 is provided only as an example, and embodiments may be associated with additional elements or components. According to some embodiments, the elements of the system 100 automatically support interactive user interface displays over a distributed communication network. For example, FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a back-end module coordination system computer server may access an enterprise source code repository data store including a plurality of source code module components. At S220, the back-end module coordination system computer server may access an electronic work request record, the work request record being associated with a work request identifier, a release date, and at least a first source code module component in the enterprise source code repository data store.

At S230, the system may establish, through a communication interface that facilitates an exchange of electronic messages, including messages exchanged via a distributed communication network, a first interactive user interface display at a first remote developer device (associated with a first developer identifier). The display may include individual lines of code from the first source code module component, and each line of code that has been changed since a previous release of the first source code module component may be tagged with an associated work request identifier and may be graphically provided in association with a developer identifier.

At S240, the system may arrange for the first interactive user interface display to reflect all changes dynamically that have been made since the previous release of the first source code module component, including those associated with other developer identifiers and multiple release dates. Providing the ability to see all changes may eliminate the need to run compares between multiple versions. Knowing exactly what each developer is changing within their shared components may help the entire change process to eliminate collisions. Moreover, according to some embodiments, there may be no versioning or multiple copies of a source that need to be merged together (that is, multiple versions, branching, and/or manual merging might not be required). Such an approach may reduce the storage space required to store such files. According to some embodiments, a first developer might not be authorized to change a line of code that was created or changed by second developer. In this case, the first developer might need to contact the second developer (e.g., via a telephone call or email message) to communicate his or her needs. For example, only members of development group associated with a particular work request might be authorized to change a particular code portion (and other developers may be blocked from doing so).

At S250, the system may associate the first source code module component with a current module lock status comprising one of: an open edit state, a closed edit state, and a compiling state. The open edit state might mean that developers can edit the first source code module component. The closed edit state might mean that at least some developers cannot edit the first source code module component. For example, only developers working in a group authorized to alter code associated with a particular work request identifier might be allowed to make changes to certain lines of code. The compiling state indicating that the first source code module component is being complied by the system.

At S260, the system may associate the first source code module component with a frozen status indicating that tagged lines of code in the first source code module component cannot be edited. According to some embodiments, the current module lock status may further comprise a protected state during which an administrative clean-up process may be performed. For example, upon a new release of the first source code module component the clean-up process may re-baseline changes that will be dynamically reflected on interactive user interface displays.

In this way, a Module Coordination System ("MCS") may provide a customized change and environment management system. Note that the MCS is not a version or level management check in and check out system. That is, there might not be multiple versions of source code and/or levels stored within the MCS. Instead, all ongoing delta changes may be stored within a single base. When a programmer or developer needs to move work to an integrated environment (e.g., a test, user, staging, and/or production environment), the responsibility of knowing what version or level to migrate/merge is not with the developer. Instead, the MCS may internally control migration/merging without limits to the number of ongoing requests/changes at any one time within a source component. Moreover, according to some embodiments, the MCS may provide mainframe source control, audit and historical reporting, corporate standard compile and link, application load library synchronization and maintenance, compile sysout management, automated DB2 compile binds and change control and release management. Note that the MCS might also provide maintenance for Multiple Virtual Storage ("MVS") environments including: nightly program scratches and excludes, binds, staging library recreation, a post release cleanup process.

Figure 3:
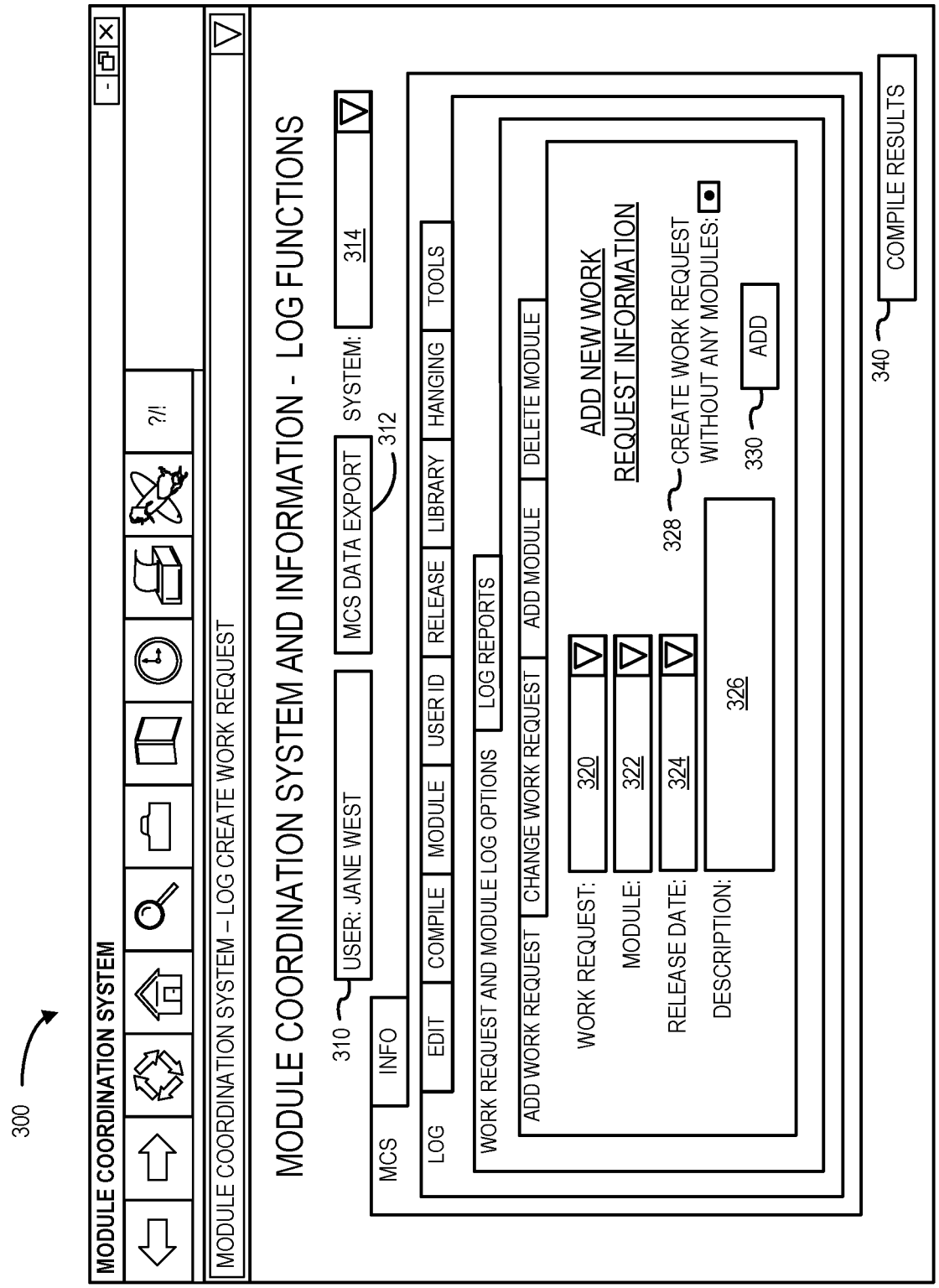
FIG. 3 is a module coordination system log functions display in accordance with some embodiments.

The MCS may be implemented using any number of interactive user interface displays. For example, FIG. 3 is a module coordination system log functions display 300 in accordance with some embodiments. In particular, the display 300 may let a developer or user 310 export data 312 for a particular system 314. A "Work Request And Module Log Options" tab may include, for example, options to add a work request, change a work request, add a module, delete a module, etc. In the example of FIG. 3, a work request may be added by entering a work request identifier 320 (e.g., via a drop-down menu), a module identifier 322, a release date 324 (e.g., via a pop-up calendar), and a text description 326 of the work request. Note that work requests may represent a group of source components associated with a developer's project, and each work request may be associated with a production release date. According to some embodiments, there may be an infinite number of work requests targeted for any release date. Moreover, there might be any number of components associated with any given work request (e.g., hundreds of modules/components might be associated with a single work request). The display 300 might let a developer create a work request without any associated module 328 and/or add new work request information via an "Add" icon 330 as appropriate. The display 300 may also let a developer "Compile Results" via an icon 340.

Figure 4:
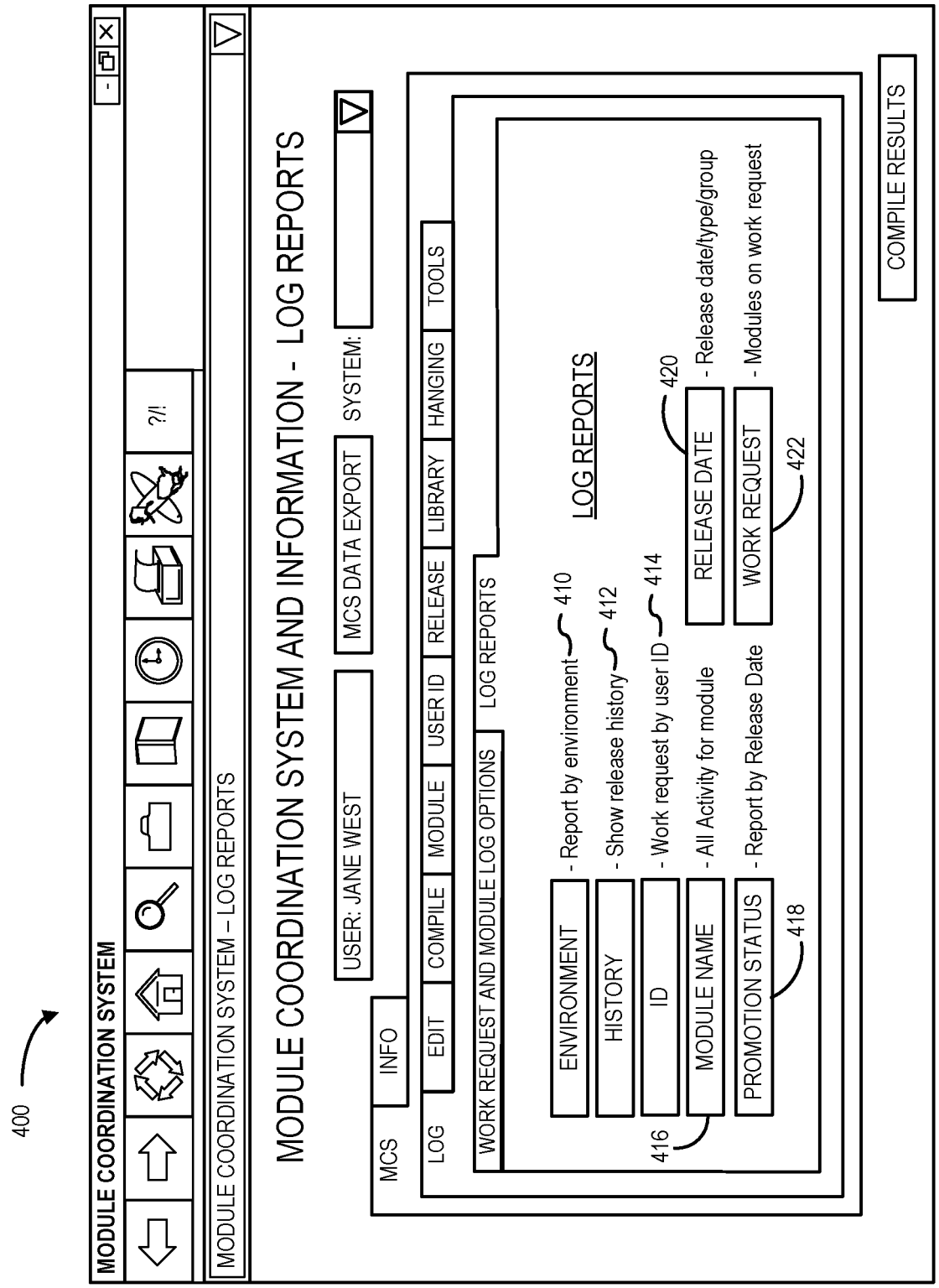
FIG. 4 is a module coordination system log reports display according to some embodiments of the present invention.

FIG. 4 is a module coordination system log reports display 400 (as opposed to the "Work Request and Module Log Options" tab illustrated in FIG. 3) according to some embodiments of the present invention. The log reports display 400 may provide developers with a vast array of reports, including: source component details (names, descriptions, types, etc.); reports by environment 410, all environments (who, what, when, etc.); multiple years of release history reporting 412 (who, what, when, etc.); work request by user identifier 414; module name 416 (details all work in progress in any given component); promotion status 418 (pre-release health check, report by release date, etc.); release date 420; and/or work request contents 422 (environment status, who, contention, etc.).

Figure 5:
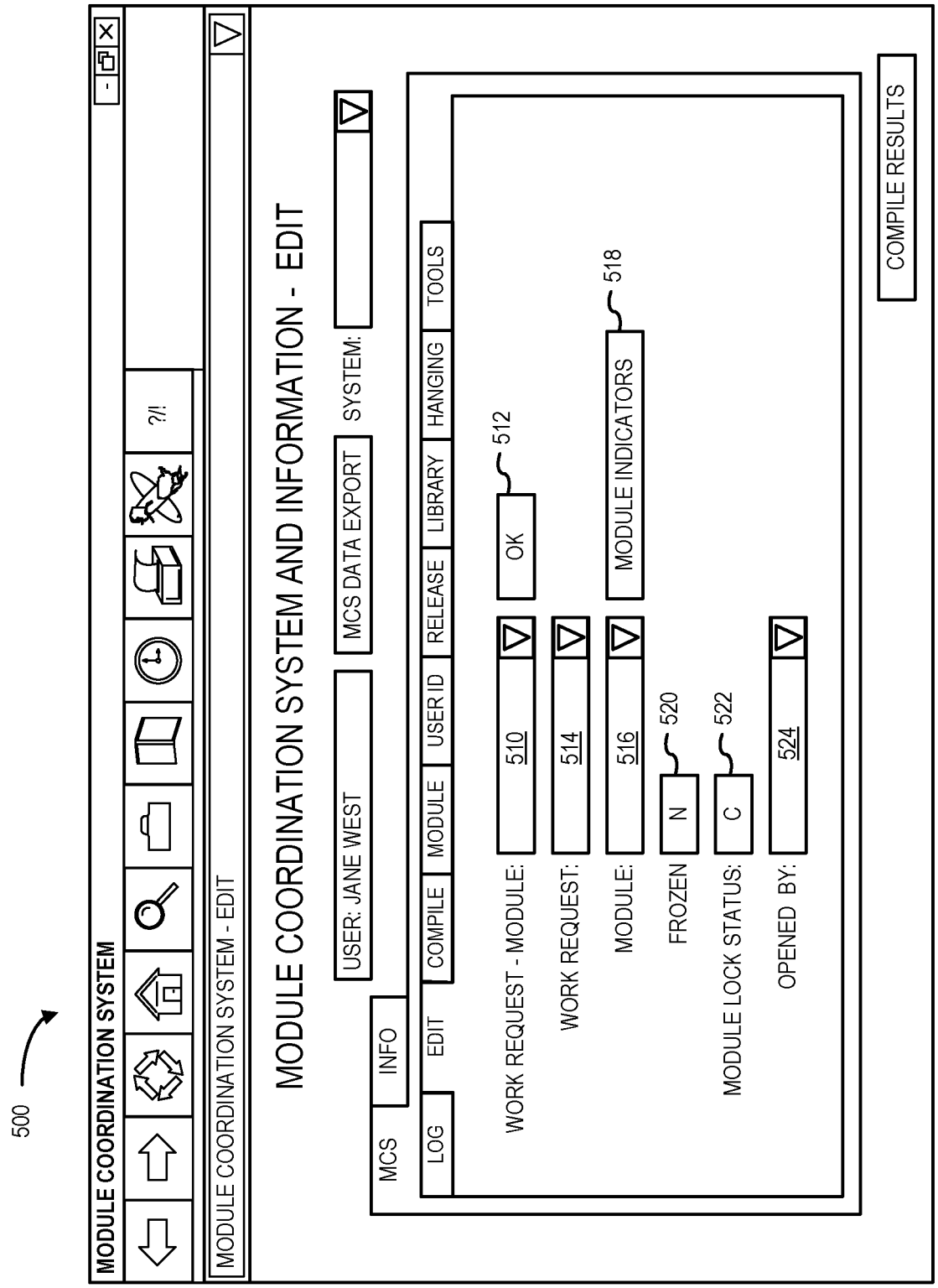
FIG. 5 is a module coordination system edit display in accordance with some embodiments.

FIG. 5 is a module coordination system edit display 500 in accordance with some embodiments The system edit display 500 may let developers easily modify their source components. The data file editor (described with respect to FIG. 6) may have customized profiles providing edit capabilities for various mainframe source components, such as: COBOL, MFS, Copybooks, DBL, assembler, Eztrieve, etc. The system may, according to some embodiments, provide automated snapshot backups of every edit session detailing "before" and "after" changes. Such a snapshot audit trail may provide the "who," "what," and "when" of code changes (down to the line of code modified). The snapshot may also be used to fallback to a previous modification. As illustrated in FIG. 5, the display 500 may include a work request module identifier 510 (e.g., selected via a drop-down menu and "OK" icon 512), a work request identifier 514, a module identifier 516 (e.g., accessible via a "Module Indicators" icon 518), a frozen indication 520 (e.g., which might indicate that tagged lines of code are scheduled to be moved to a production environment and therefore cannot be changed), a module lock status indication 522, and an "Opened By" indication 524. Note that an indication of which lines of code are locked when frozen might (or might not) be included on the display. According to some embodiments, the display 500 may further include a module protection level/or a list of approved users.

Figure 6:
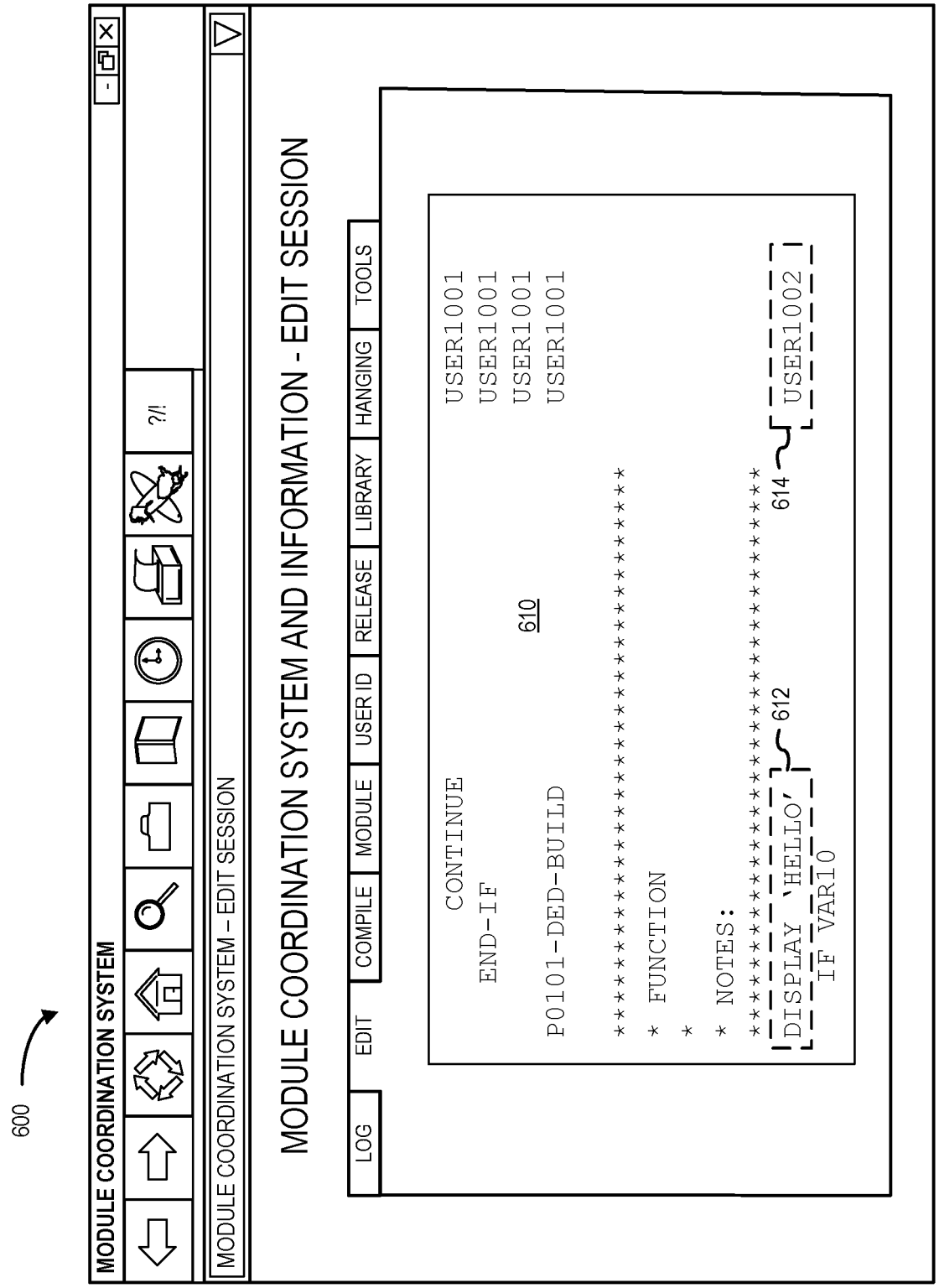
FIG. 6 is a module coordination system edit session display according to some embodiments of the present invention.

FIG. 6 is a module coordination system edit session display 600 according to some embodiments of the present invention. The edit session display 610 renders lines of code 610 for a developer so that he or she can view the data and/or update the code as appropriate. Each line of code might include a text code portion 612 and an associated text developer identifier 614 (e.g., indicating the last developer who changed, inserted, or deleted that particular line of code). Note that within a developer's edit session, the MCS may provide a unique method to view all changes dynamically that are in progress with any given component. If multiple developers are changing the same component, all changes (regardless of release date) might be visible to each developer within his or her edit session. Note that is approach is different from a typical source control tool. By providing an ability to see all changes, the MCS may reduce the need to run compares between multiple versions. Moreover, knowing exactly what each developer is changing within shared components may help the entire change process (e.g., be reducing the possibility of collisions).

Figure 7:
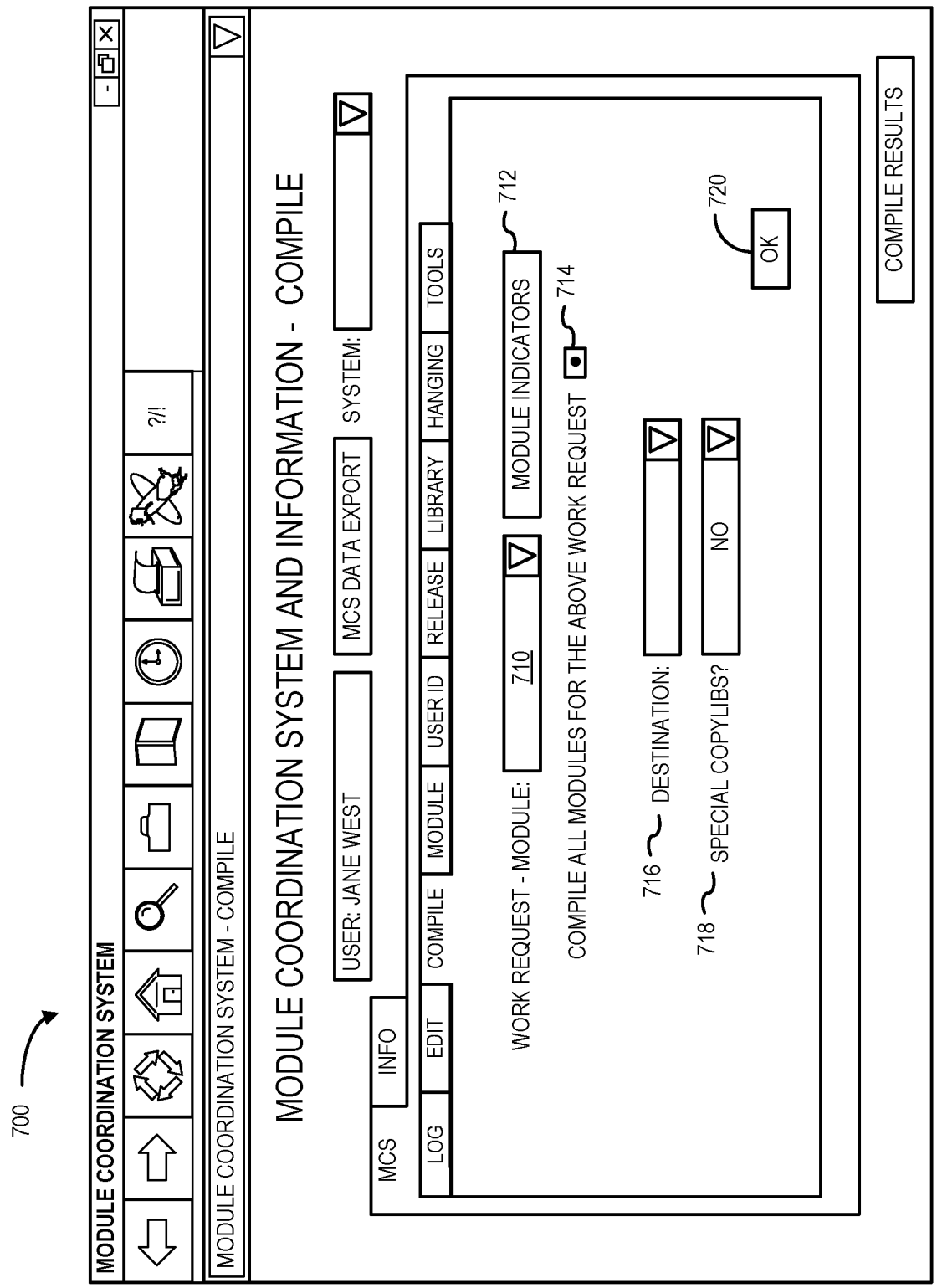
FIG. 7 is a module coordination system compile display in accordance with some embodiments.

FIG. 7 is a module coordination system compile display 700 in accordance with some embodiments. The display 700 includes a work request module identifier 710 (e.g., selectable from a pull down menu and/or a "Module Indicators"

712 icon) and an indication that the system should compile all modules for that particular work request 714. The display 700 may further include a destination 716 (e.g., a device, file location, etc.), a "Special Copylibs" indication 718, and/or an "OK" icon 720 to save data as appropriate.

The display 700 may allow a developer to promote or demote work to and from any environment. For example, the MCS may integrate with other release tools and/or security including: a stores and leveling application, a production release system, etc. The MCS may ensure each compile (regardless of source type) is done with Job Control Language ("JCL"), LCS, Non-LCS, Xpediter, etc. as appropriate. As a result, developers may not need to worry about creating JCL information. Instead, an entire work request and all components may be compiled and/or migrated with a single click (or components may be handled done individually as needed). Note how the MCS might handle automatic merging during the compile process. If multiple developers are in the same component, then the MCS may merge them automatically if they are already migrated to an environment. Further note that if a developer only needs to demote his or her change (down to the line of code level), he or she might do that with a click of a button without having to manage other's code in the same component (that is, the MCS may back out his or her code and keep all other's changes automatically in the environment). According to some embodiments, the MCS also handles business program aliases/or and program rename compiles.

Figure 8:
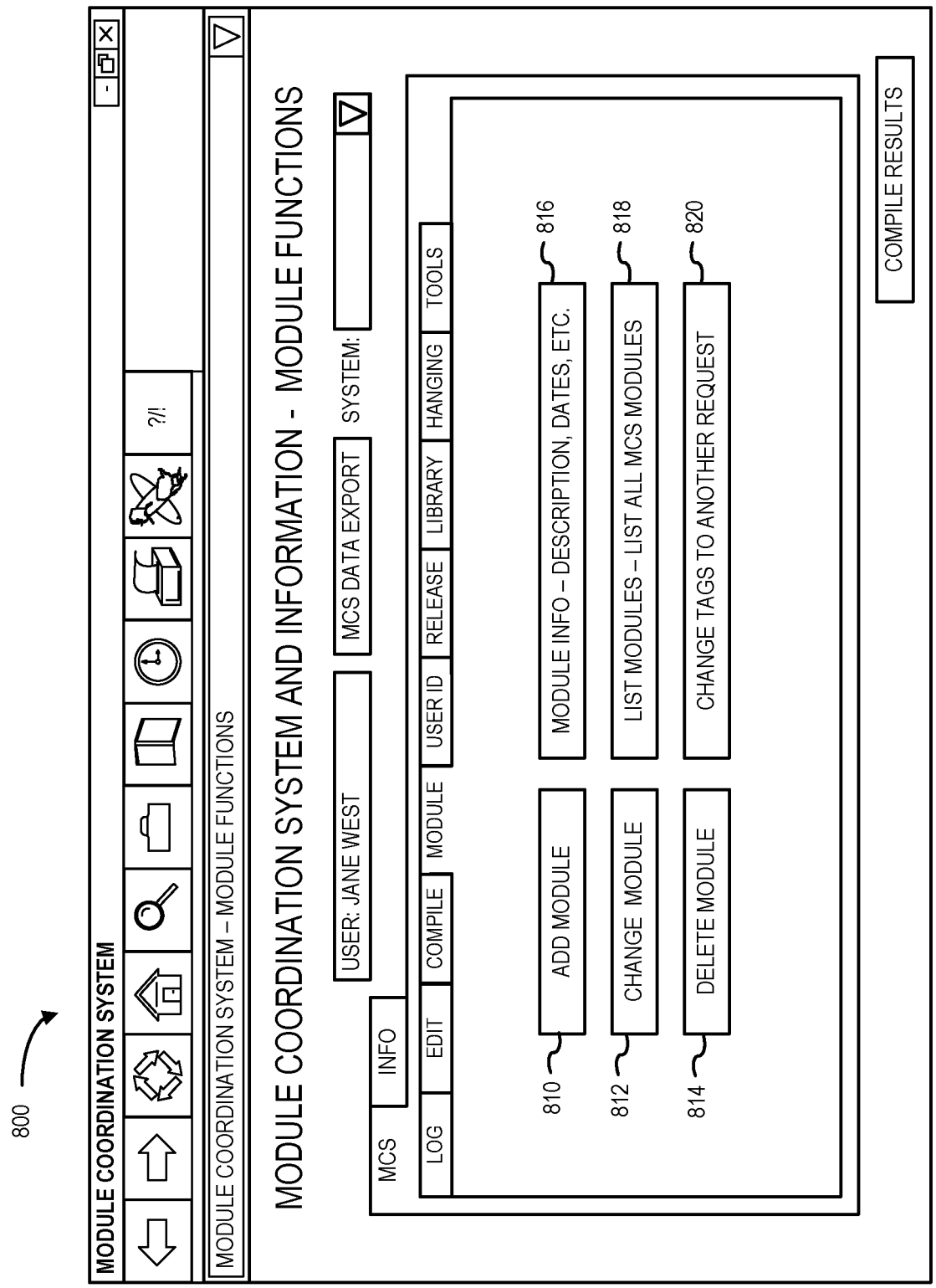
FIG. 8 is a module coordination system module functions display according to some embodiments of the present invention.

FIG. 8 is a module coordination system module functions display 800 according to some embodiments of the present invention. The module functions display 800 may let developers create new programs and introduce them into the MCS. Note that module characteristics such as compile types and/or descriptions might be modified or flagged as obsolete. Developers may also change their work request tags to another work request assignment. In particular, the display 800 provides an ability to add a module 810, change a module 812, delete a module 814, request module information 816 (e.g. description, dates, etc.), request a list of modules 818, and/or change tags from one request to another 820 as appropriate.

Figure 9:
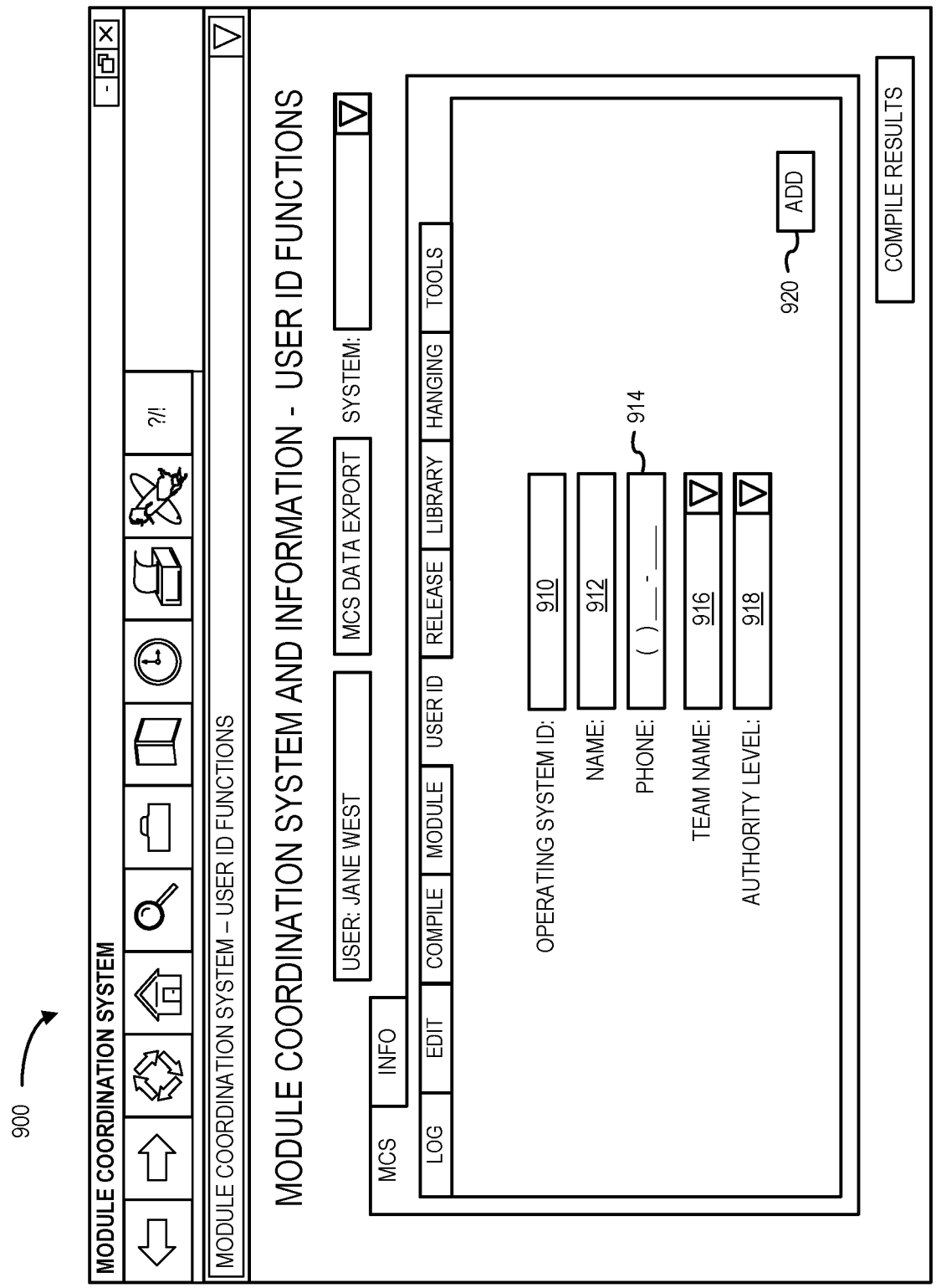
FIG. 9 is a module coordination system user identifier functions display in accordance with some embodiments.

FIG. 9 is a module coordination system user identifier functions display 900 in accordance with some embodiments. Using the user identifier functions display 900, new customers can be added and/or existing customers can be modified for the MCS. Note that customer profiles and authority levels might be granted or altered by an MCS administration team. The profile information might include, for example, an operating system identifier 910, a name 912, one or more phone numbers 914, a team name 916, and/or an authority level 918 (e.g., selectable via a drop-down menu). The profile data may then be saved via an "Add" icon 920.

Figure 10:
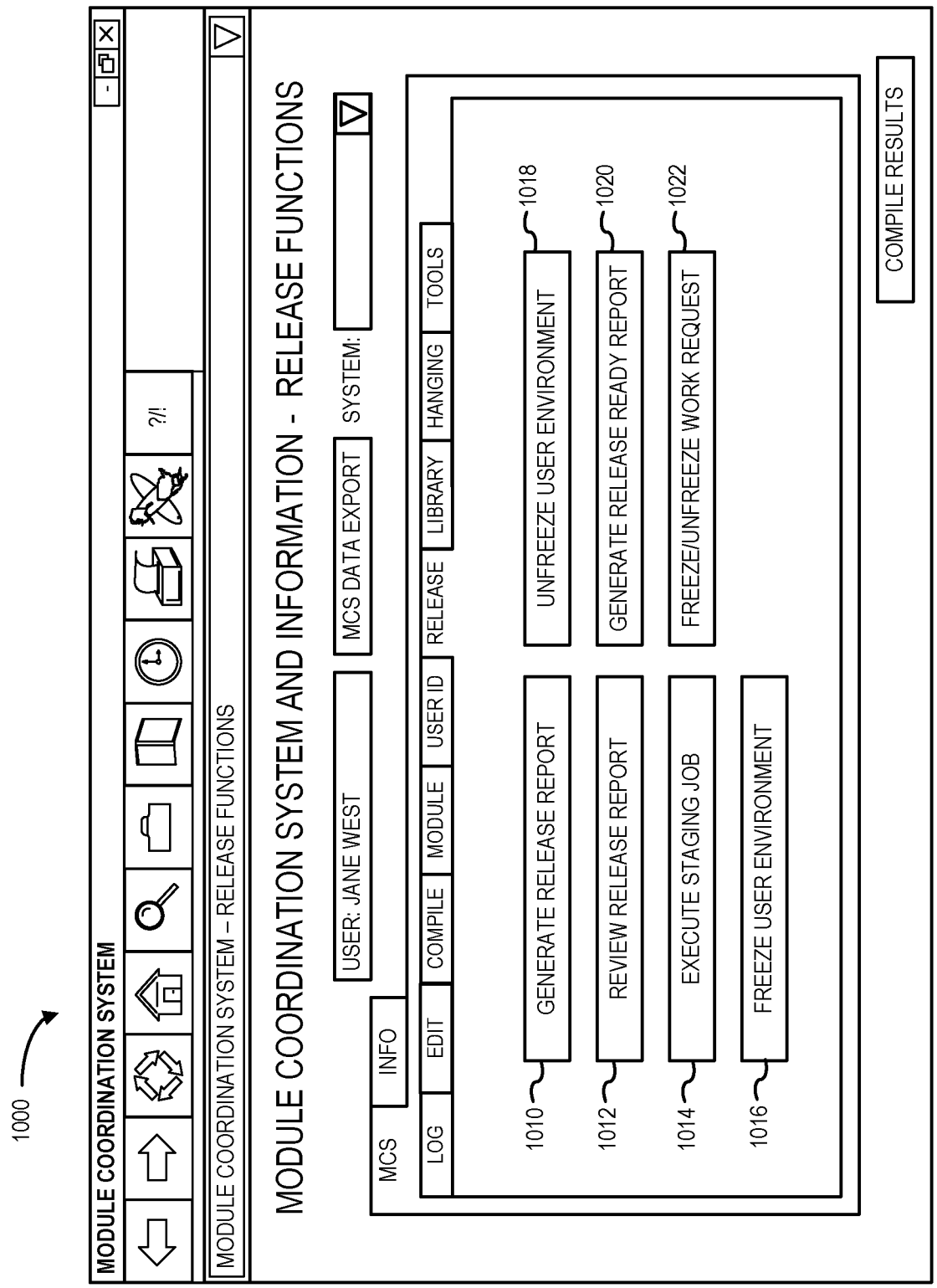
FIG. 10 is a module coordination system release functions display according to some embodiments of the present invention.

FIG. 10 is a module coordination system release functions display 1000 according to some embodiments of the present invention. The release functions display 1000 can be used, for example, by authorized staff to setup and stage production releases. According to some embodiments, pre-release health check reports can be run to verify if all components have been staged and previously migrated through test and user integration environments. In some embodiments, authorized staff can also execute hard code freezes to prevent any additional code changes from being made (e.g., after a specified pre-release change moratorium). Moreover, code might be frozen down to the line level. According to some embodiments, although a component has code frozen for a release, the MCS may let developers continue with additional ongoing changes within the same component to provide continuous delivery for future releases. In the display 1000 of FIG. 10, options may include a request to generate a release report 1010, review a release report 1012, execute a staging job 1014, freeze the user environment 1016, un-freeze the user environment 1018, generate a release ready report 1020, and/or to freeze (or un-freeze) a work request 1022.

Figure 11:
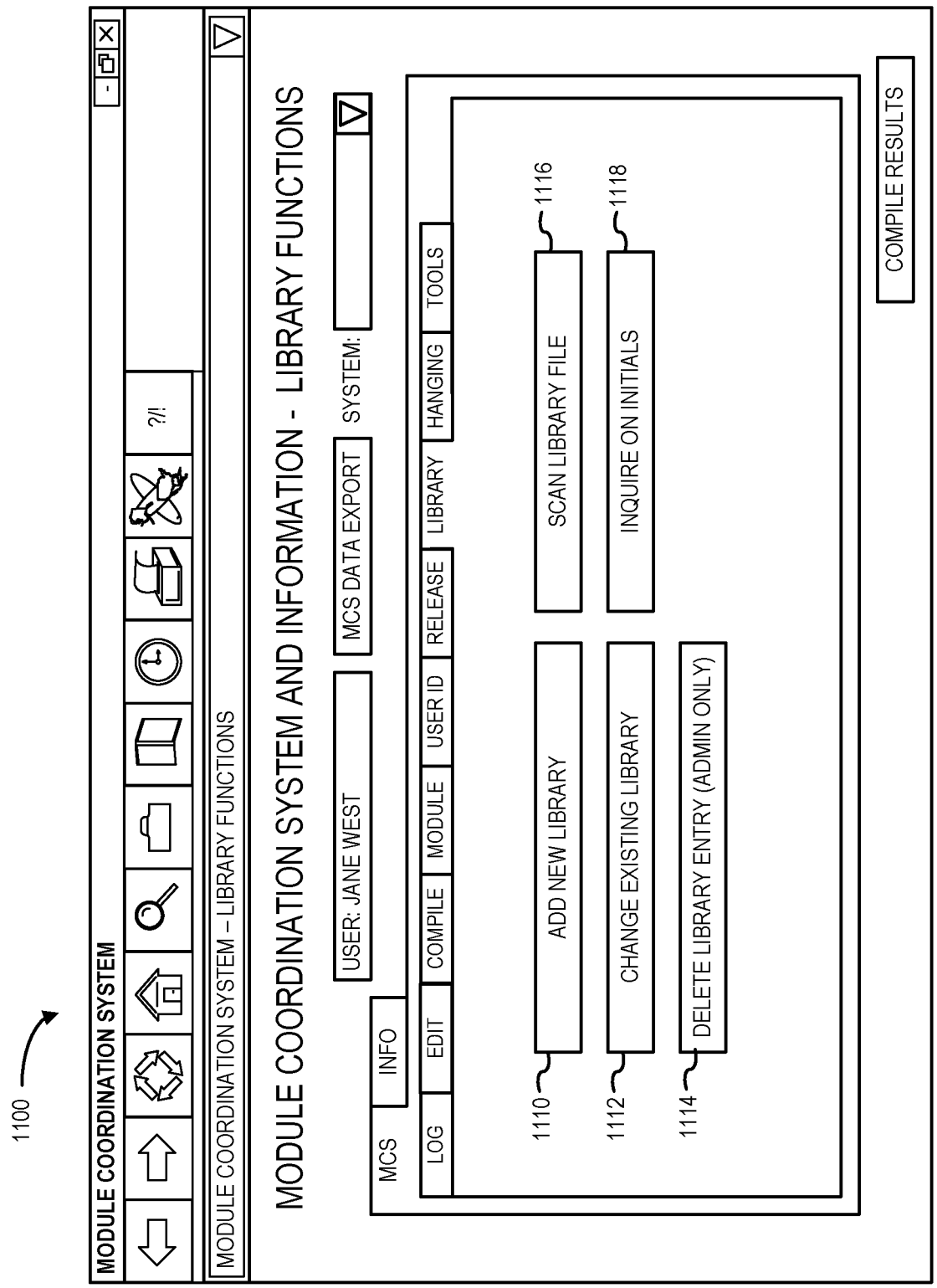
FIG. 11 is a module coordination system library functions display in accordance with some embodiments.

FIG. 11 is a module coordination system library functions display 1100 in accordance with some embodiments. The library functions display 1100 may let the MCS store the information for every divisional library name and location used by all customers. According to some embodiments, pointers may provide a compile destination. Note that customers may also create their own sandbox libraries and point the MCS to compile to the appropriate sandbox destinations. The display 1100 includes options to add a new library 1110, change an existing library 1112, delete a library 1114, scan a library file 1116, and/or inquire on initials 1118.

Figure 12:
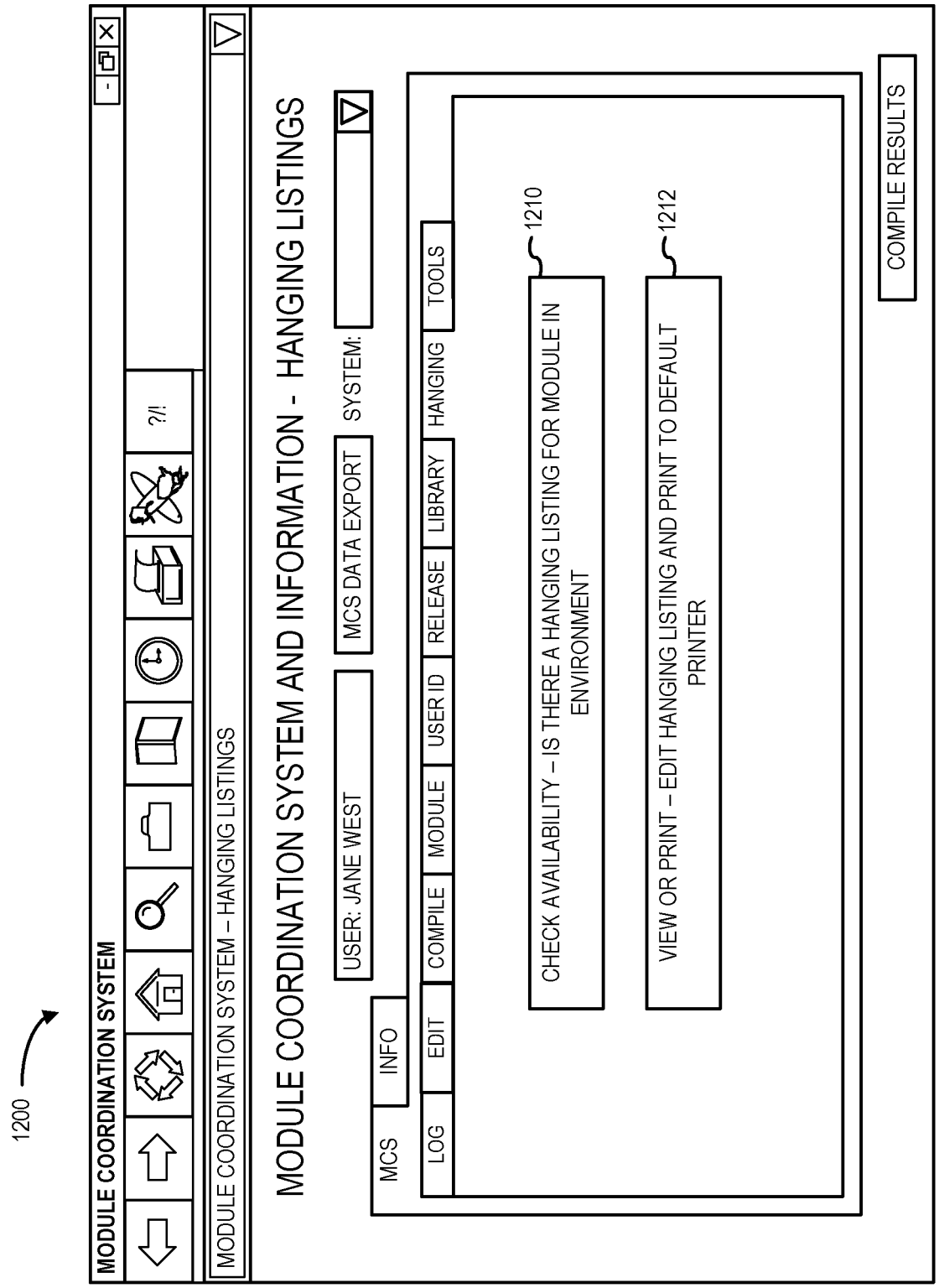
FIG. 12 is a module coordination system hanging listing display in accordance with some embodiments.

FIG. 12 is a module coordination system hanging listing display 1200 in accordance with some embodiments. The hanging listing display 1200 may let developers view their mainframe compile sysout within the MCS tool without being required to be connected to the mainframe. According to some embodiments, all compile results and sysout are returned to the tool which may reduce the need for developers to access a mainframe tool to view sysout. Note that developers may be notified of their compile results immediately within the MCS Integrated Development Environment ("IDE"). The display 1200 includes options to check availability 1210 (e.g., to determine if there is a hanging listing for a module in the environment) and/or to view or print 1212 (e.g., to edit a hanging listing and print to a default printer).

Figure 13:
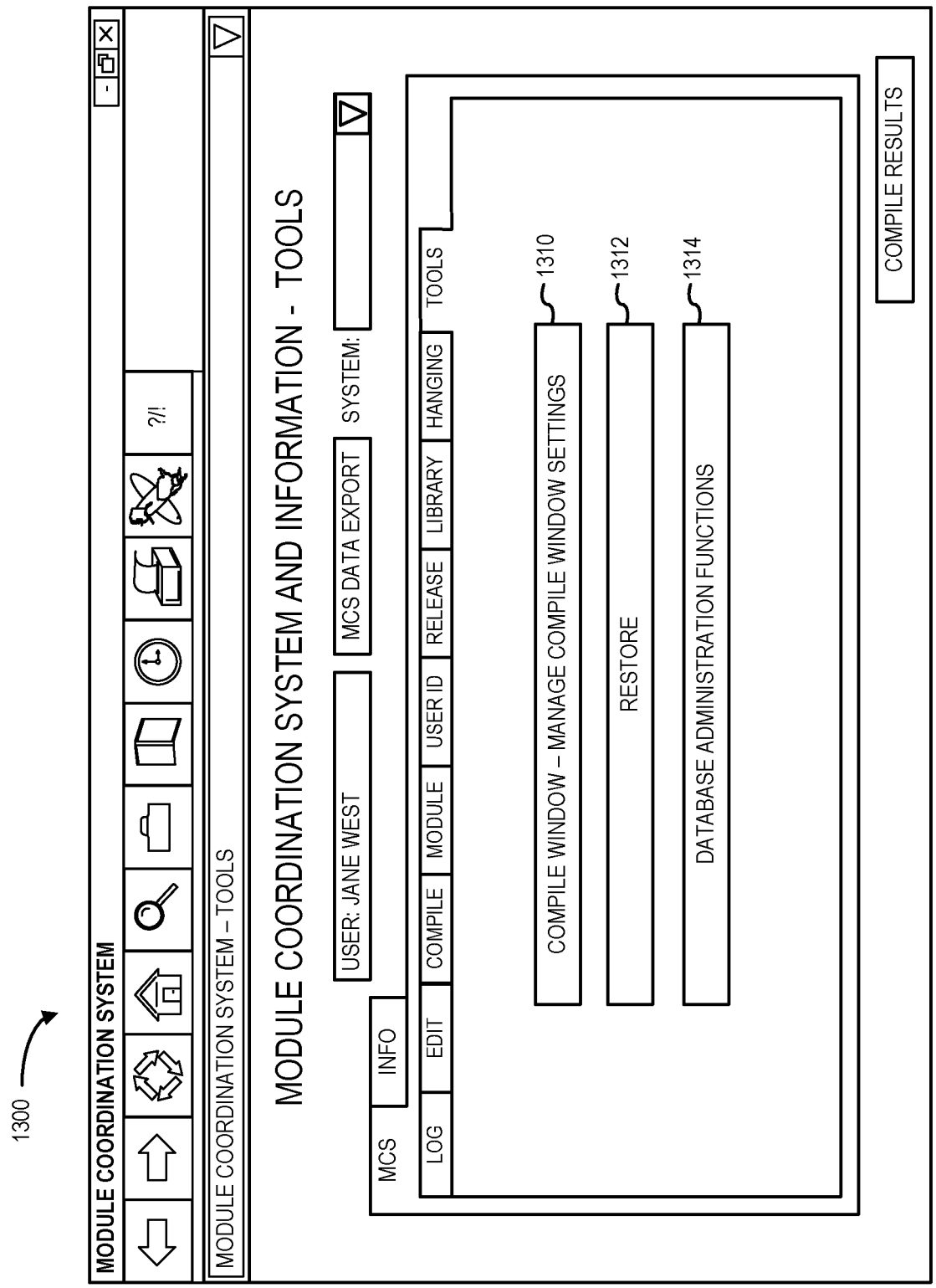
FIG. 13 is a module coordination system tools display according to some embodiments of the present invention.

FIG. 13 is a module coordination system tools display 1300 according to some embodiments of the present invention. The tools display 300 may allow administrators to conduct program restores, provide internal MCS database manipulation, and/or provide the ability to freeze compile times for customer environments (e.g., when an area needs environment stability for a period of time). In this case, a developer's submitted compiles may be held and queued until after the window time freeze. After the time freeze, these changes may be automatically submitted. In particular, the tools display 1300 includes options for a compile window 1310 (e.g., to manage compile window default settings), restore 1312, and/or database administration functions 1314.

Figure 14:
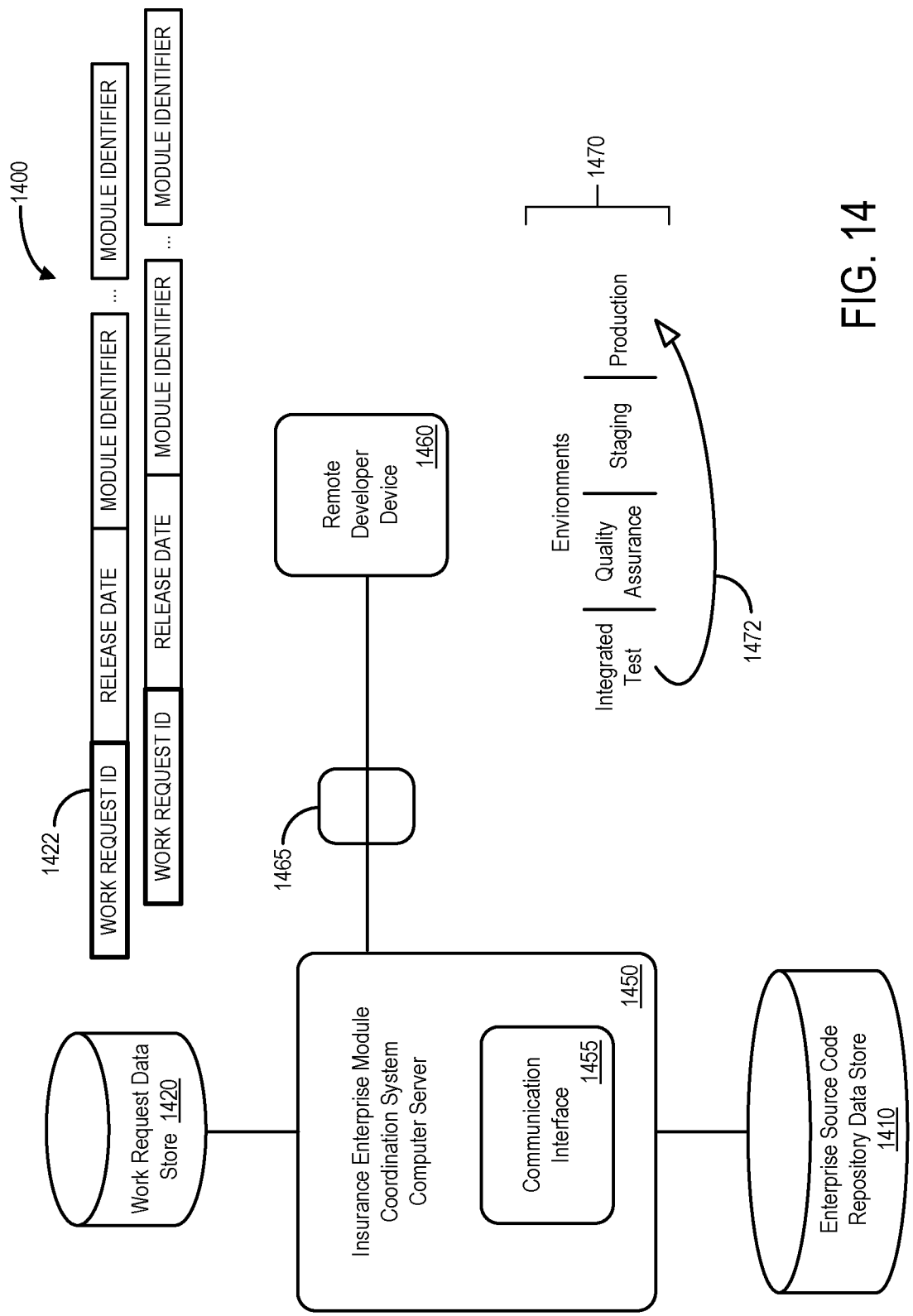
FIG. 14 is a more detailed view of an insurance enterprise system according to some embodiments.

FIG. 14 is a more detailed view of an insurance enterprise system 1400 according to some embodiments. The system 1400 includes an insurance enterprise module coordination system computer server 1450 that may access information in an enterprise source code repository data store 1410 (e.g., storing a set of electronic records representing source code for modules and/or components of insurance enterprise software). The insurance enterprise module coordination system computer server 1450 may also exchange information with remote developer devices 1460 (e.g., via a firewall 1465). According to some embodiments, a communication interface 1455 of the insurance enterprise module coordination system computer server 1450 may communicate with the developer devices 1460, access information in the enterprise source code repository data store 1410, and coordinate changes to source code module components.

The insurance enterprise module coordination system computer server 1450 might be, for example, associated with a PC, laptop computer, smartphone, an enterprise server, a server farm, and/or a database or similar storage devices. The insurance enterprise module coordination system computer server 1450 may store information into and/or retrieve information from the enterprise source code repository data store 1410 and/or a work request data store 1420. The work request data store 1420 might, for example, store electronic records 1422 representing changes that need to be made to insurance enterprise software, including a work request identifier, release date, module identifier, etc. The enterprise source code repository data store 1410 may contain software that was downloaded and/or that was originally input via a remote developer device 1460 (e.g., by developer). The enterprise source code repository data store 1410 may be used by the insurance enterprise module coordination system computer server 1450 to automatically coordinate software changes and/or manage environment 1470 migrations (e.g., from integrated test to production as illustrated by the arrow in FIG. 14).

Figure 15:
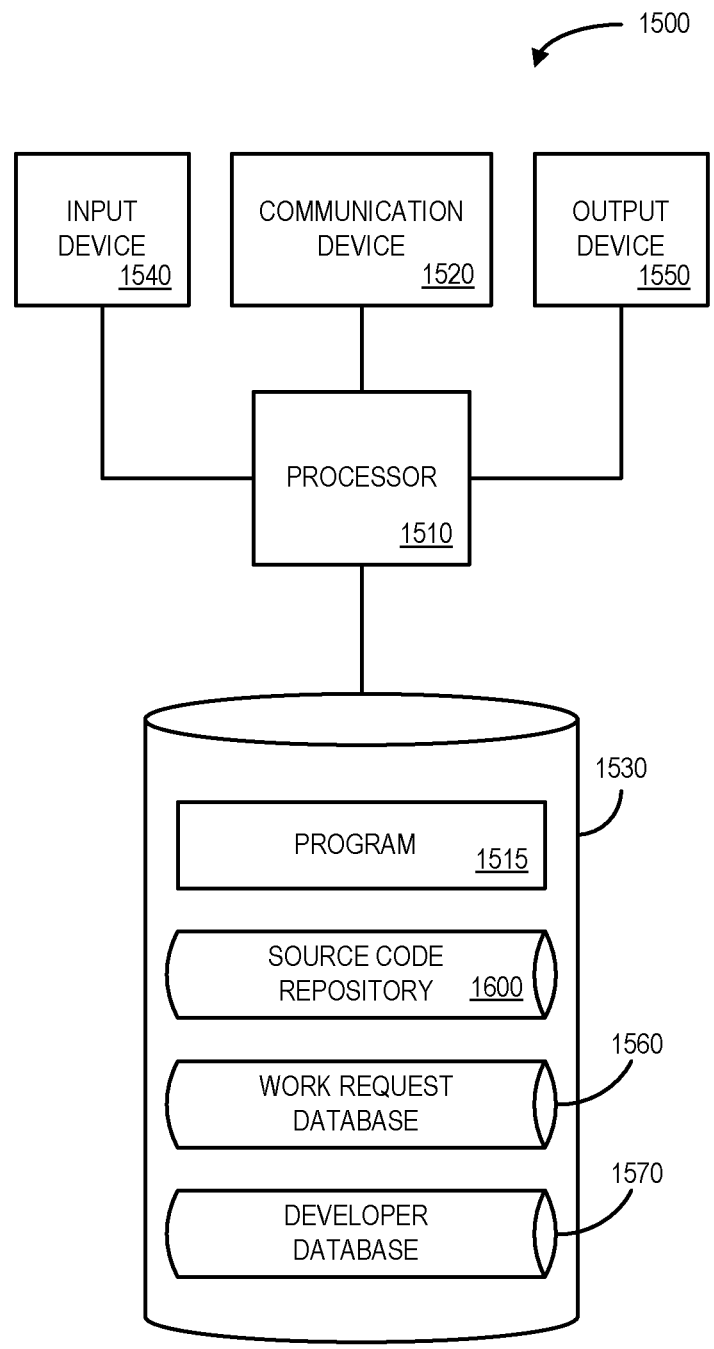
FIG. 15 is a block diagram of an apparatus in accordance with some embodiments of the present invention.

Embodiments described herein may comprise a tool to coordinate source code module changes and may be implemented using any number of different hardware configurations. For example, FIG. 15 illustrates a back-end module coordination system computer server 1500 that may be, for example, associated with the systems 100, 1400 of FIGS. 1 and 14, respectively. The back-end module coordination system computer server 1500 comprises a processor 1510, such as one or more commercially available Central Processing Units ("CPUs") in the form of one-chip microprocessors, coupled to a communication device 1520 configured to communicate via a communication network (not shown in FIG. 15). The communication device 1520 may be used to communicate, for example, with one or more remote developer devices (e.g., PCs and smartphones). Note that communications exchanged via the communication device 1520 may utilize security features, such as those between a public internet user and an internal network of an insurance enterprise. The security features might be associated with, for example, web servers, firewalls, and/or PCI infrastructure. The back-end module coordination system computer server 1500 further includes an input device 1540 (e.g., a mouse and/or keyboard to enter information about enterprise configuration, legacy systems, etc.) and an output device 1550 (e.g., to output error messages, generate reports regarding migration status, etc.).

The processor 1510 also communicates with a storage device 1530. The storage device 1530 may comprise any appropriate information storage device, including combinations of magnetic storage devices (e.g., a hard disk drive), optical storage devices, mobile telephones, and/or semiconductor memory devices. The storage device 1530 stores a program 1515 and/or a dispatch tool or application for controlling the processor 1510. The processor 1510 performs instructions of the program 1515, and thereby operates in accordance with any of the embodiments described herein. For example, the processor 1510 may access an enterprise source code repository data store containing source code module components, and a communication interface may support interactive user interface displays at remote developer devices. The processor 1510 may access an electronic work request record, associated with a work request identifier, a release date, and at a first source code module component in the enterprise source code repository data store. A first remote developer device (associated with a first developer identifier) may establish a first interactive user interface display including individual lines of code (where each line of code that has been changed since a previous release of the first source code module component is tagged with an associated work request identifier and is shown in association with a developer identifier). According to some embodiments, the processor 1510 arranges for the first interactive user interface display to reflect all changes dynamically that have been made since the previous release of the first source code module component, including those associated with other developer identifiers and multiple release dates.

The program 1515 may be stored in a compressed, uncompiled and/or encrypted format. The program 1515 may furthermore include other program elements, such as an operating system, a database management system, and/or device drivers used by the processor 1510 to interface with peripheral devices.

As used herein, information may be "received" by or "transmitted" to, for example: (i) the back-end module coordination system computer server 1500 from another device; or (ii) a software application or module within the back-end module coordination system computer server 1500 from another software application, module, or any other source.

In some embodiments (such as shown in FIG. 15), the storage device 1530 further stores a source code repository database 1600, a work request database 1560, and a developer database 1570. An example of a database that might be used in connection with the back-end module coordination system computer server 1500 will now be described in detail with respect to FIG. 16. Note that the database described herein is only an example, and additional and/or different information may be stored therein. Moreover, various databases might be split or combined in accordance with any of the embodiments described herein. For example, the source code repository database 1600 and/or work request database 1560 might be combined and/or linked to each other within the program 1515.

Figure 16:
FIG. 16 is a portion of a tabular source code repository database in accordance with some embodiments.

Referring to FIG. 16, a table is shown that represents the source code repository database 1600 that may be stored at the back-end module coordination system computer server 1500 according to some embodiments. The table may include, for example, entries identifying source code module components that might be used by an enterprise. The table may also define fields 1602, 1604, 1606, 1608, 1610, 1612, 1614 for each of the entries. The fields 1602, 1604, 1606, 1608, 1610, 1612, 1614 may, according to some embodiments, specify: a source code module component identifier 1602, a line of code 1604, a last developer identifier 1606, a current developer identifier 1608, a change date 1610, a work request 1612 (and associated release date), and current module lock status 1614. The source code repository database 1600 may be created and updated, for example, based on information electrically received from remote developer devices.

The source code module component identifier 1602 may be, for example, a unique alphanumeric code identifying enterprise software that may be periodically updated by developers (e.g., to support new features and/or to remove problems in the software as they are discovered). The line of code 1604 might comprise a particular line of software code and the last developer identifier 1606 may indicate the party who last adjusted that code. That the both the line of code 1604 and the last developer identifier 1606 might be provided on an edit screen. The current developer identifier 1608 might indicate a party who is currently modifying that line of software and the change date 1610 might indicate when the last adjustment was made to that line of software. The work request 1612 (and associated release date) might, for example, indicate a work request associated with the last change made to that line of software. The current module lock status 614 might assigned at a component-by-component level and might indicate: an open edit state (during which developers can edit the first source code module component), a closed edit state (during which at least some developers cannot edit the first source code module component), a compiling state (indicating that the first source code module component is being complied by the system), and/or a protected state (during which an administrative clean-up process may be performed (e.g., to re-baseline changes upon a new release of the component). According to some embodiments, the source code repository database might further store an indication as to whether or not a component is currently frozen (e.g., such that tagged lines of code cannot be changed by at least some developers).

Thus, embodiments may provide an automated and efficient way to coordinate source code module component changes. This may help reduce an amount of time required to implement new enterprise features, reduce collisions between software developers, etc.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 17:
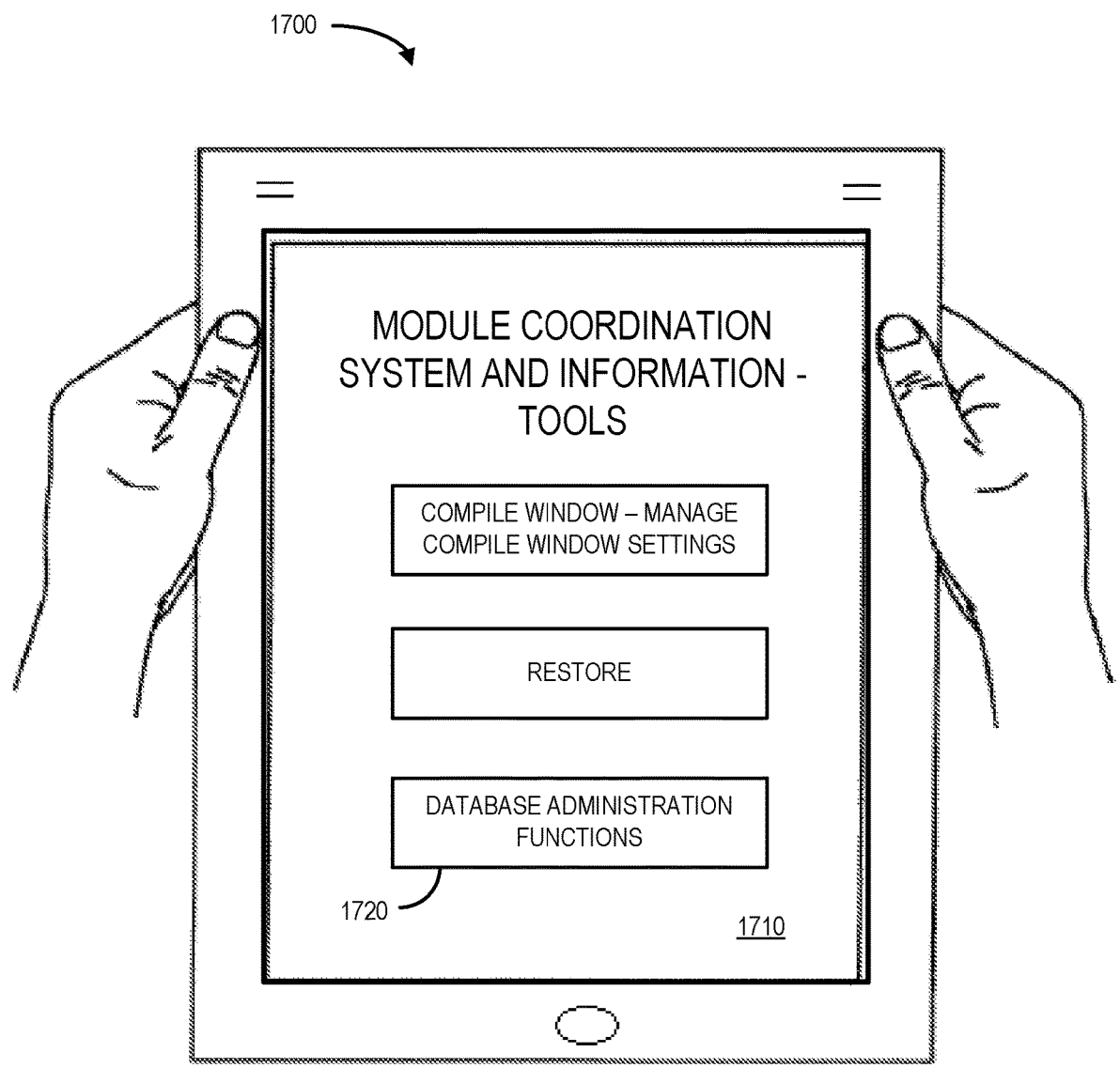
FIG. 17 illustrates a handheld tablet device displaying a module coordination system tools display according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or any of the embodiments might be implemented using a cloud based computing platform). Moreover, although embodiments have been described with respect to particular types of source code module components, embodiments may instead be associated with other types of code files. Still further, the displays and devices illustrated herein are only provided as examples, and embodiments may be associated with any other types of user interfaces. For example, FIG. 17 illustrates a handheld touchscreen tablet computer 1700 with a MCS tools display 1710 according to some embodiments. In particular, the display 1710 includes selection areas 1720 that might be used by a developer to edit compile window default settings, restore data, etc.

Figure 18:
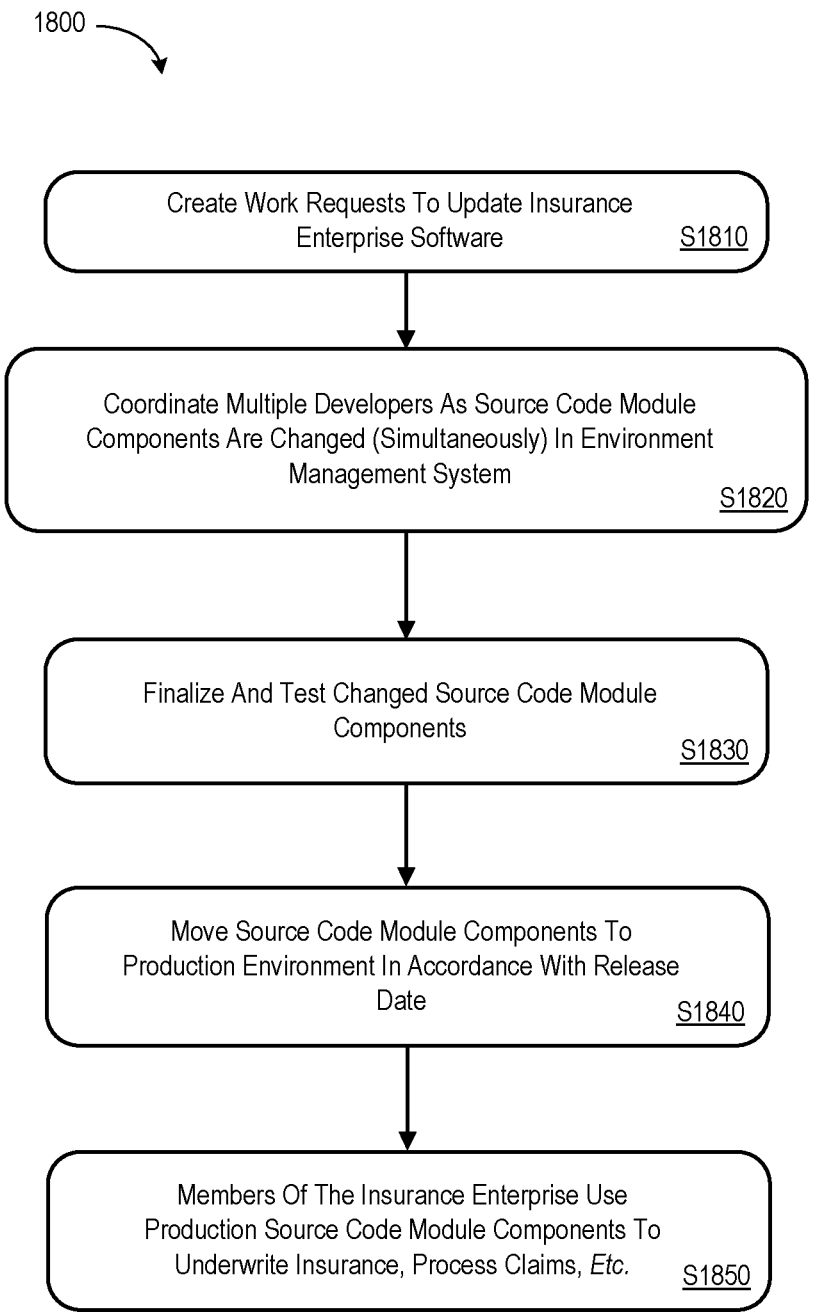
FIG. 18 illustrates an overall insurance enterprise workflow in accordance with some embodiments.

Note that embodiments described herein might be used in connection with a number of different types of business process flows. For example, FIG. 18 illustrates an overall process 1800 that might be associated with an insurance enterprise in accordance with some embodiments. At S1810, work requests may be created to update insurance enterprise software. The work requests might, for example, support a new type of insurance policy, a new field on an insurance claim form, etc. At S1820, the system may coordinate multiple developers as source code module components are changed in an environment management system in accordance with any of the embodiments described herein. At S1830, the changed source code module components may be finalized and tested to ensure that they function properly. At S1840, the system may move source code module components to a production environment in accordance with a work request release date. At S1850, members of the insurance enterprise may use the production source code module components (e.g., when underwriting insurance policies, processing insurance claims, etc.).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system, comprising:
(a) a communication interface to facilitate an exchange of electronic messages, including messages exchanged via a distributed communication network, supporting interactive user interface displays at remote developer devices; and
(b) a back-end module coordination system computer server, coupled to the enterprise source code repository data store and the communication interface, including:
a computer processor, and
a computer memory, coupled to the computer processor, storing instructions that when executed by the computer processor cause the back-end module coordination system computer server to:
(i) access an electronic work request record, the work request record being associated with a work request identifier, a release date, and at least a first source code module component in an enterprise source code repository data store storing a plurality of source code module components,
(ii) establish, via a first remote developer device associated with a first developer identifier, a first interactive user interface display including individual lines of code from the first source code module component, wherein each line of code that has been changed since a previous release of the first source code module component is tagged with an associated work request identifier and is graphically provided in association with a developer identifier,
wherein the first interactive user interface display reflects all changes dynamically that have been made since the previous release of the first source code module component, including those associated with other developer identifiers,
(iii) associate the first source code module component with a current module lock status comprising one of: an open edit state during which developers can edit the first source code module component, a closed edit state during which at least some developers cannot edit the first source code module component, and a compiling state indicating that the first source code module component is being complied by the system,
(iv) associate the first source code module component with a frozen status indicating that tagged lines of code in the first source code module component cannot be edited,
(v) receive, via a second remote developer device associated with a second developer identifier, an initial attempt to edit an initial line of code in the first source code module component within the enterprise source code repository data store,
(vi) automatically determine that the initial line of code is tagged and, as a result, block the attempt to edit the initial line of code, (vii) receive, via the second remote developer device, a subsequent attempt to edit a subsequent line of code in the first source code module component within the enterprise source code repository data store, and (viii) automatically determine that the subsequent line of code is not tagged and, as a result, allow the edit of the subsequent line of code.

2. The system of claim 1, wherein the current module lock status may further comprise a protected state during which an administrative clean-up process may be performed, upon a new release of the first source code module component, to re-baseline changes that will be dynamically reflected on interactive user interface displays.

3. The system of claim 1, wherein the back-end module coordination system computer sever supports work request and module log options to perform at least one of: (i) add work request, (ii) change work request, (iii) add module to work request, and (iv) delete module from work request.

4. The system of claim 3, wherein a work request may be further associated with at least one of: (i) a release group, and (ii) a description.

5. The system of claim 1, wherein the back-end module coordination system computer sever supports log reports, including at least one of: (i) an environment-based log report, (ii) a release history log by work request, (iii) a report work request of a user identifier, (iv) a report including all activity for a module, (v) a report by release date, (vi) a report by release date, type and group, and (vii) a report associated with modules of a specific work request.

6. The system of claim 1, wherein the back-end module coordination system computer sever supports an edit function including at least one of: (i) an indication of a party that opened a module, (ii) a module protection level, and (iii) a list of approved users.

7. The system of claim 1, wherein the back-end module coordination system computer sever supports compile functions including at least one of: (i) a compile destination, (ii) a copybook library indication.

8. The system of claim 1, wherein the back-end module coordination system computer sever supports module functions including at least one of: (i) add module, (ii) change module, (iii) delete module, (iv) provide module information, (v) list modules, and (vi) changing tags from one request to another request.

9. The system of claim 1, wherein the back-end module coordination system computer sever supports user identification functions including at least one of: (i) an operating system identifier, (ii) a name, (iii) a contact communication address, (iv) a team name, and (v) an authority level.

10. The system of claim 1, wherein the back-end module coordination system computer sever supports release functions including at least one of: (i) generating a release report, (ii) reviewing a release report, (iii) executing staging job, (iv) freezing a user environment, (v) un-freezing a user environment, (vi) generating a release ready report, and (vii) freezing or un-freezing a work request.

11. The system of claim 1, wherein the back-end module coordination system computer sever supports library functions including at least one of: (i) adding a new library, (ii) changing an existing library, (iii) deleting a library, (iv) scanning a library file, and (v) inquiring a library in association with initials.

12. The system of claim 1, wherein the back-end module coordination system computer sever supports hanging listings including at least one of: (i) checking an availability to see if there is a hanging listing for a module in an environment, (ii) viewing hanging listing information, and (iii) printing hanging listing information.

13. The system of claim 1, wherein the back-end module coordination system computer server is further to perform at least one of the following: (i) maintenance for multiple virtual storage environments, (ii) periodic program scratches and excludes, (iii) binds, (iv) staging library recreation, and (v) post release cleanup.

14. A method, comprising:
accessing, by a back-end module coordination system computer server, an enterprise source code repository data store including a plurality of source code module components;

accessing, by the back-end module coordination system computer server, an electronic work request record, the work request record being associated with a work request identifier, a release date, and at least a first source code module component in the enterprise source code repository data store;

establishing a first interactive user interface display at a first remote developer device, associated with a first developer identifier, including individual lines of code from the first source code module component, wherein each line of code that has been changed since a previous release of the first source code module component is tagged with an associated work request identifier and is graphically provided in association with a developer identifier, wherein the first interactive user interface display reflects all changes dynamically that have been made since the previous release of the first source code module component, including those associated with other developer identifiers;

associating the first source code module component with a current module lock status comprising one of: an open edit state during which developers can edit the first source code module component, a closed edit state during which at least some developers cannot edit the first source code module component, and a compiling state indicating that the first source code module component is being complied by the system;

associating the first source code module component with a frozen status indicating that tagged lines of code in the first source code module component cannot be edited;

receiving, via a second remote developer device associated with a second developer identifier, an initial attempt to edit an initial line of code in the first source code module component;

automatically determining that the initial line of code is tagged and, as a result, blocking the attempt to edit the initial line of code;

receiving, via the second remote developer device, a subsequent attempt to edit a subsequent line of code in the first source code module component; and automatically determining that the subsequent line of code is not tagged and, as a result, allowing the edit of the subsequent line of code.

15. The method of claim 14, wherein the back-end module coordination system computer sever supports work request and module log options to perform at least one of: (i) add work request, (ii) change work request, (iii) add module to work request, and (iv) delete module from work request.

16. The method of claim 15, wherein a work request may be further associated with at least one of: (i) a release group, and (ii) a description.

17. The method of claim 14, wherein the back-end module coordination system computer sever supports log reports, including at least one of: (i) an environment-based log report, (ii) a release history log by work request, (iii) a report work request of a user identifier, (iv) a report including all activity for a module, (v) a report by release date, (vi) a report by release date, type and group, and (vii) a report associated with modules of a specific work request.

* * * * *